US012745042B2

(12) United States Patent
Han et al.

(10) Patent No.: US 12,745,042 B2
(45) Date of Patent: Sep. 22, 2026

(54) SMART DEVICE AND CONTROL METHOD THEREFOR, COMPUTER READABLE STORAGE MEDIUM

(71) Applicant: GOERTEK. INC., Weifang (CN)

(72) Inventors: Feifei Han, Weifang (CN); Kang An, Weifang (CN); Zongxia Zhu, Weifang (CN)

(73) Assignee: Goertek Inc., Weifang (CN)

( * ) Notice: Subject to any disclaimer, the term of this patent is extended or adjusted under 35 U.S.C. 154(b) by 237 days.

(21) Appl. No.: 18/591,759

(22) Filed: Feb. 29, 2024

(65) Prior Publication Data

US 2024/0244371 A1 Jul. 18, 2024

Related U.S. Application Data

(63) Continuation-in-part of application No. PCT/CN2022/121825, filed on Sep. 27, 2022.

(51) Int. Cl.

| | |
|---|---|
| ***H04R 3/14*** | (2006.01) |
| ***H04M 1/72415*** | (2021.01) |
| ***H04R 1/10*** | (2006.01) |
| ***H04R 5/033*** | (2006.01) |
| ***H04S 1/00*** | (2006.01) |

(52) U.S. Cl.

CPC .......... *H04R 3/14* (2013.01); *H04M 1/72415* (2021.01); *H04R 1/1008* (2013.01); *H04R 1/1041* (2013.01); *H04R 1/105* (2013.01); *H04R 1/1075* (2013.01); *H04R 5/033* (2013.01); *H04S 1/007* (2013.01); *H04R 2201/028* (2013.01)

(58) Field of Classification Search

CPC . H04R 3/04; H04R 3/14; H04R 1/028; H04R 1/1008; H04R 1/1041; H04R 1/105; H04R 1/1075; H04R 5/033; H04R 2201/028; H04M 1/72415; H04S 1/007

See application file for complete search history.

(56) References Cited

U.S. PATENT DOCUMENTS

| | | | | |
|---|---|---|---|---|
| 2007/0147640 A1* | 6/2007 | Mottier | H04R 1/1041 | 381/122 |
| 2009/0052702 A1* | 2/2009 | Murphy | H04R 1/1016 | 381/380 |
| 2009/0220113 A1* | 9/2009 | Tiscareno | H04R 1/403 | 381/380 |
| 2018/0288518 A1* | 10/2018 | Schmidt | H04R 3/14 | |

FOREIGN PATENT DOCUMENTS

| | | |
|---|---|---|
| CN | 111638779 A | 9/2020 |
| CN | 111935600 A | 11/2020 |
| CN | 112312245 A | 2/2021 |
| CN | 113992787 A | 1/2022 |

* cited by examiner

*Primary Examiner* — Jason R Kurr

(74) *Attorney, Agent, or Firm* — Baker Botts LLP

(57) ABSTRACT

A smart device and control method therefor, and a computer readable storage medium are disclosed. The smart device comprises a supporting part and a moving part coupled to the supporting part, a first speaker and a second speaker, the first speaker is provided on the supporting part of the smart device, and the second speaker is provided on an end of the moving part distal to the supporting part.

16 Claims, 3 Drawing Sheets

SMART DEVICE AND CONTROL METHOD THEREFOR, COMPUTER READABLE STORAGE MEDIUM

CROSS-REFERENCE TO RELATED APPLICATIONS

The present disclosure is a continuation-in-part of International Application No. PCT/CN2022/121825, filed on Sep. 27, 2022, which claims priority to a Chinese patent application No. CN 202111169233.0 filed on Sep. 30, 2021 and entitled "SMART DEVICE AND CONTROL METHOD THEREFOR, COMPUTER READABLE STORAGE MEDIUM", both of which are hereby incorporated by reference in their entireties.

TECHNICAL FIELD

The present disclosure relates to the field of intelligent control, and particularly to a smart device and control method therefor, and a computer readable storage medium.

BACKGROUND

With the continuous development and progress of science and technology, the development of electronic products is also accelerating. In recent years, wearable devices such as smart glasses, smart helmets. AR (Augmented Reality)/VR (Virtual Reality) devices have gradually entered people's lives, bringing new experiences to people. In order to meet people's higher-level needs for products, wearable devices have more and more functions, such as playing music, watching video, answering phones, etc.

However, traditional smart devices such as smart glasses, smart helmets, AR/VR devices, etc. mostly adopt a single playback mode, which is difficult to meet the different needs of users in different application scenarios in terms of audio effects and privacy, etc. Therefore, how to overcome the above defects to make the smart device applicable to more application scenarios and enhance the user experience is also an important development direction of the smart device in the future.

SUMMARY

An objective of the present disclosure is to provide a smart device and control method therefor, and a computer readable storage medium, intended for realizing the intelligent control of a smart device to meet needs in different application scenarios and improve the user's experience.

In order to achieve the above objective, the present disclosure provides a control method for a smart device, the smart device comprises a supporting part and a moving part coupled to the supporting part, as well as a first speaker and a second speaker, the first speaker is provided on the supporting part of the smart device, and the second speaker is provided on an end of the moving part distal to the supporting part; the control method for a smart device comprises the following steps:

receiving an audio signal, and obtaining a current application scenario according to the audio signal;

determining a target processing manner and a target control mode according to the current application scenario;

processing the audio signal according to the target processing manner to obtain a processed audio signal;

controlling, according to the target control mode, the first speaker and/or the second speaker to output the processed audio signal.

Optionally, when the current application scenario is an entertainment scenario, determining the target processing manner as the first processing manner and determining the target control mode as the first control mode;

said "processing the audio signal according to the target processing manner to obtain a processed audio signal" comprises:

performing audio effects processing on the audio signal and performing frequency division processing on the audio signal subjected to the audio effects processing to obtain a medium-low frequency signal and a medium-high frequency signal, wherein the processed audio signal comprises the medium-low frequency signal and the medium-high frequency signal;

said "controlling, according to the target control mode, the first speaker and/or the second speaker to output the processed audio signal" comprises:

sending the medium-low frequency signal to the first speaker and sending the medium-high frequency signal to the second speaker, so as to control the first speaker to output the medium-low frequency signal and control the second speaker to output the medium-high frequency signal.

Optionally, the smart device comprises a left processing module and a right processing module, said "performing audio effects processing on the audio signal and performing frequency division processing on the audio signal subjected to the audio effects processing to obtain a medium-low frequency signal and a medium-high frequency signal" comprises:

performing the audio effects processing on the audio signal by the left processing module, and performing the frequency division processing on the audio signal subjected to the audio effects processing with a first preset crossover point, so as to obtain a first left ear medium-low frequency signal and a first left ear medium-high frequency signal;

performing the audio effects processing on the audio signal by the right processing module, and performing the frequency division processing on the audio signal subjected to the audio effects processing with the first preset crossover point, so as to obtain a first right ear medium-low frequency signal and a first right ear medium-high frequency signal.

Optionally, said "performing the audio effects processing on the audio signal by the left processing module, and performing the frequency division processing on the audio signal subjected to the audio effects processing with a first preset crossover point, so as to obtain a first left ear medium-low frequency signal and a first left ear medium-high frequency signal" comprises:

performing the audio effects processing on the audio signal by the left processing module to obtain a left channel audio signal;

copying the left channel audio signal by the left processing module to obtain a first left channel audio signal and a second left channel audio signal;

performing the frequency division processing on the first left channel audio signal by the left processing module with the first preset crossover point, so as to obtain the first left ear medium-low frequency signal; performing the frequency division processing on the second left channel audio signal by the left processing module with the first preset crossover point, so as to obtain the first left ear medium-high frequency signal.

Optionally, the smart device comprises a main processing module, and said "performing audio effects processing on the audio signal and performing frequency division processing on the audio signal subjected to the audio effects processing to obtain a medium-low frequency signal and a medium-high frequency signal" comprises:

performing the audio effects processing on the audio signal by the main processing module to obtain a left channel audio signal and a right channel audio signal;

processing the left channel audio signal by the main processing module to obtain a second left ear medium-low frequency signal and a second left ear medium-high frequency signal;

processing the right channel audio signal by the main processing module to obtain a second right ear medium-low frequency signal and a second right ear medium-high frequency signal.

Optionally, said "processing the left channel audio signal by the main processing module to obtain a second left ear medium-low frequency signal and a second left ear medium-high frequency signal" comprises:

copying the left channel audio signal by the main processing module to obtain a third left channel audio signal and a fourth left channel audio signal;

performing the frequency division processing on the third left channel audio signal by the main processing module with a second preset crossover point, so as to obtain the second left ear medium-low frequency signal; performing the frequency division processing on the fourth left channel audio signal by the main processing module with the second preset crossover point, so as to obtain the second left ear medium-high frequency signal.

Optionally, when the current application scenario is a call scenario, determining the target processing manner as a second processing manner, and determining the target control mode as a second control mode;

said "processing the audio signal according to the target processing manner to obtain a processed audio signal" comprises:

performing the audio effects processing on the audio signal to obtain the audio signal subjected to the audio effects processing;

said "controlling, according to the target control mode, the first speaker and/or the second speaker to output the processed audio signal" comprises:

controlling only the second speaker to output the audio signal subjected to the audio effects processing.

Optionally, before said "controlling, according to the target control mode, the first speaker and/or the second speaker to output the processed audio signal", further comprising:

performing digital-to-analog conversion and amplification processing on the audio signal subjected to the audio effects processing to obtain a secondary processed audio signal;

said "controlling, according to the target control mode, the first speaker and/or the second speaker to output the processed audio signal" comprises:

controlling only the second speaker to output the secondary processed audio signal.

Optionally, said "receiving an audio signal, and obtaining a current application scenario according to the audio signal" comprises:

receiving the audio signal and obtaining a signal path corresponding to the audio signal;

determining the current application scenario according to the signal path.

In addition, in order to achieve the above objective, the present disclosure also provides a smart device, the smart device comprises a first speaker and a second speaker, and further comprises a supporting part and a moving part coupled to the supporting part, the first speaker is provided on the supporting part of the smart device, the second speaker is provided on an end of the moving part distal to the supporting part, the smart device further comprises a memory, a processor and a control program which is stored in the memory and can be run by the processor, and the control program when executed by the processor implements steps of the above control method for a smart device.

Optionally, the first speaker comprises a first left speaker and a first right speaker, and the second speaker comprises a second left speaker and a second right speaker;

the smart device further comprises a left processing module, a right processing module, a left power amplifier module and a right power amplifier module, wherein the left processing module is electrically connected with the left power amplifier module, the first left speaker and the second left speaker respectively, and the right processing module is electrically connected with the right power amplifier module, the first right speaker and the second right speaker respectively; wherein, the left processing module is configured for performing an audio effects processing on the audio signal, and performing a frequency division processing on the audio signal subjected to the audio effects processing with a first preset crossover point, so as to obtain a first left ear medium-low frequency signal and a first left ear medium-high frequency signal; sending the first left ear medium-low frequency signal and the first left ear medium-high frequency signal to the left power amplifier module;

the left power amplifier module is configured for performing digital-to-analog conversion and amplification processing on the first left ear medium-low frequency signal and the first left ear medium-high frequency signal, so as to obtain a processed first left ear medium-low frequency signal and a processed first left ear medium-high frequency signal;

the left processing module is further configured for sending a processed first left ear medium-low frequency signal to the first left speaker so as to control the first left speaker to output the processed first left ear medium-low frequency signal, and sending a processed first left ear medium-high frequency signal to the second left speaker so as to control the second left speaker to output the processed first left ear medium-high frequency signal;

the right processing module is configured for performing an audio effects processing on the audio signal, and performing the frequency division processing on the audio signal subjected to the audio effects processing with the first preset crossover point, so as to obtain a first right ear medium-low frequency signal and a first right ear medium-high frequency signal; sending the first right ear medium-low frequency signal and the first right ear medium-high frequency signal to the right power amplifier module;

the right power amplifier module is configured for performing digital-to-analog conversion and amplification processing on the first right ear medium-low frequency signal and the first right ear medium-high frequency signal, so as to obtain a processed first right ear medium-low frequency signal and a processed first right ear medium-high frequency signal;

the right processing module is further configured for sending the processed first right ear medium-low frequency signal to the first right speaker so as to control the first right speaker to output the processed first right ear medium-low frequency signal, and sending the processed first right ear medium-high frequency signal to the second right speaker so as to control the second right speaker to output the processed first right ear medium-high frequency signal.

Optionally, the first speaker comprises a first left speaker and a first right speaker, and the second speaker comprises a second left speaker and a second right speaker; the smart device further comprises a main processing module and a main power amplifier module, the main processing module is electrically connected with the main power amplifier module, the first left speaker, the first right speaker, the second left speaker and the second right speaker respectively; wherein, the main processing module is configured for performing an audio effects processing on the audio signal to obtain a left channel audio signal and a right channel audio signal;

the main processing module is further configured for processing the left channel audio signal to obtain a second left ear medium-low frequency signal and a second left ear medium-high frequency signal; and processing the right channel audio signal to obtain a second right ear medium-low frequency signal and a second right ear medium-high frequency signal;

the main power amplifier module is configured for performing digital-to-analog conversion and amplification processing on the second left ear medium-low frequency signal and the second left ear medium-high frequency signal, so as to obtain a processed second left ear medium-low frequency signal and a processed second left ear medium-high frequency signal; and performing digital-to-analog conversion and amplification processing on the second right ear medium-low frequency signal and the second right ear medium-high frequency signal, so as to obtain a processed second right ear medium-low frequency signal and a processed second right ear medium-high frequency signal;

the main processing module is further configured for sending the processed second left ear medium-low frequency signal to the first left speaker so as to control the first left speaker to output the processed second left ear medium-low frequency signal, and sending the processed second left ear medium-high frequency signal to the second left speaker so as to control the second left speaker to output the processed second left ear medium-high frequency signal;

the main processing module is further configured for sending the processed second right ear medium-low frequency signal to the second right speaker so as to control the second right speaker to output the processed second right ear medium-low frequency signal, and sending the processed second right ear medium-high frequency signal to the second right speaker so as to control the second right speaker to output the processed second right ear medium-high frequency signal.

In addition, in order to achieve the above objective, the present disclosure further provides a computer readable storage media, the computer readable storage media stores a control program therein, and the control program, when executed by a processor, implements steps of the above control method for a smart device.

The present disclosure provides a smart device and control method therefor, and a computer readable storage medium. The control method for a smart device is applied to a smart device. The smart device comprises a supporting part and a moving part coupled to the supporting part, as well as a first speaker and a second speaker, the first speaker is provided on the supporting part of the smart device, and the second speaker is provided on an end of the moving part distal to the supporting part; by receiving an audio signal, and obtaining a current application scenario according to the audio signal; then, determining a target processing manner and a target control mode according to the current application scenario; in turn, processing the audio signal according to the target processing manner to obtain a processed audio signal, and controlling, according to the target control mode, the first speaker and/or the second speaker to output the processed audio signal. Wherein, when the audio signal is processed, it will be subjected to frequency division processing or non-frequency division processing according to the current application scenario and sent to the corresponding speaker for output. In this way, it is possible to realize the intelligent control of the smart device to meet the needs in different application scenarios and thus improve the user's experience.

BRIEF DESCRIPTION OF THE DRAWINGS

In order to clearly illustrate embodiments of the present application or technical solutions in the prior art, accompanying drawings that need to be used in description of the embodiments or the prior art will be briefly introduced as follows. Obviously, drawings in following description are only the embodiments of the present application. For those skilled in the art, other drawings can also be obtained according to the disclosed drawings without creative efforts.

Implementation of the objects, functional features and advantages of the present disclosure will be further described with reference to the accompanying drawings in connection with the embodiments.

DETAILED DESCRIPTION

Technical solutions in the embodiments of the present disclosure are described below with reference to the accompanying drawings in the embodiments of the present disclosure. Apparently, the described embodiments are merely some rather than all of the embodiments of the present disclosure. All other embodiments, acquired by those of ordinary skill in the art based on the embodiments of the present disclosure without any creative work, should fall into the protection scope of the present disclosure.

Figure 1:
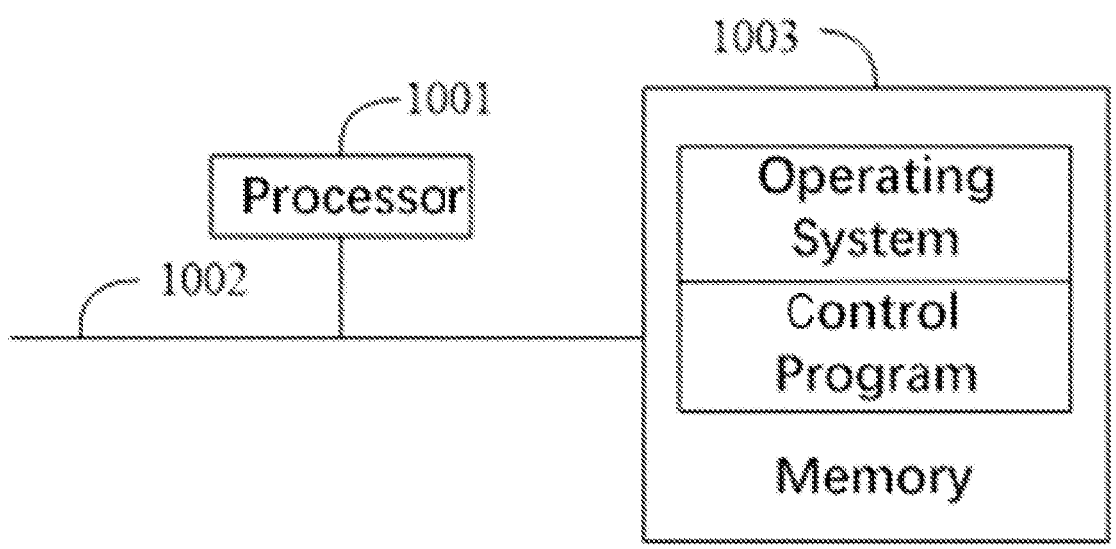
FIG. 1 is a structural schematic illustration of a terminal of a hardware operating environment related to an embodiment of the present disclosure.

FIG. 1 is a structural schematic illustration of a terminal of a hardware operating environment related to an embodiment of the present disclosure.

Figure 3:
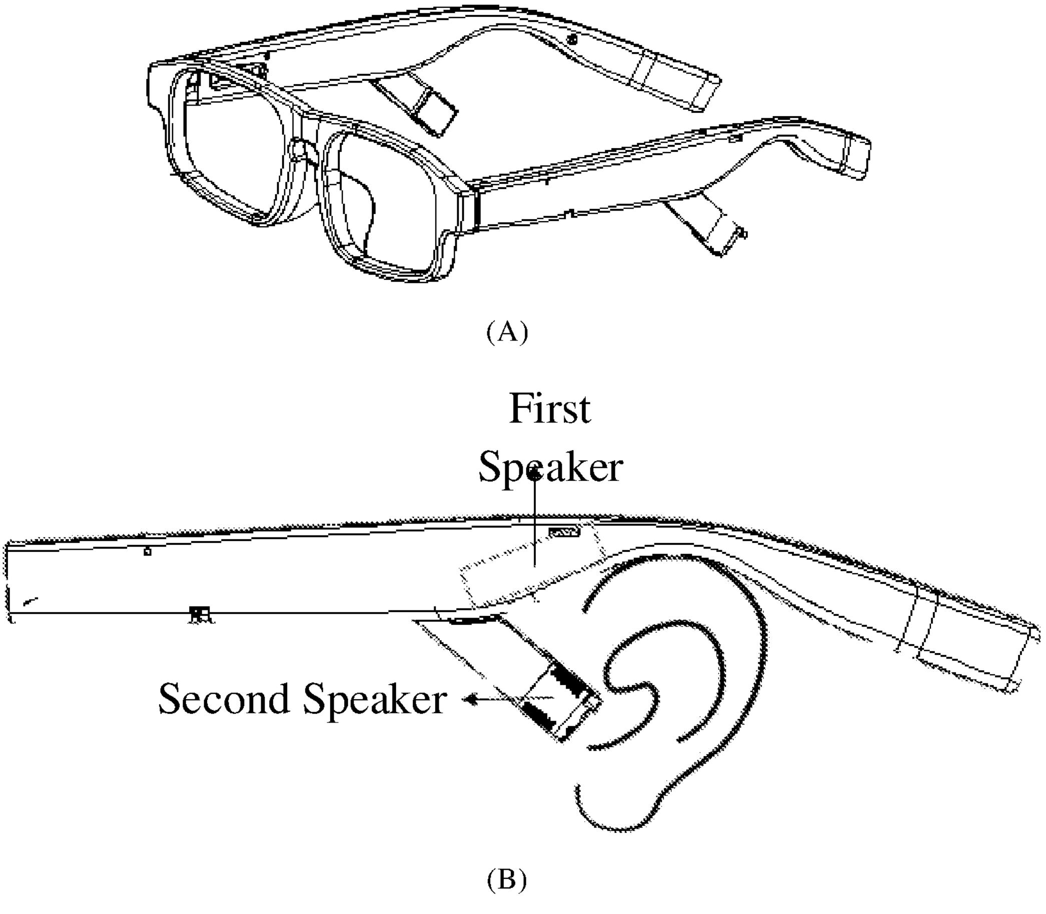
FIG. 3 is a structural schematic illustration of smart glasses related to an embodiment of the present disclosure.

The terminal of the embodiment of the present disclosure is a smart device. The type of the smart device may include, but is not limited to, smart glasses, AR/VR devices, smart helmets, and the like. The smart device comprises a first speaker and a second speaker, and further comprises a supporting part and a moving part coupled with the supporting part. As one arrangement of the speaker, the first speaker is provided on the supporting part of the smart device, and the second speaker is provided on an end of the moving part distal to the supporting part, that is, the first speaker is distal to the human ear, the second speaker may be unfolded and provided proximate to the human ear, wherein the first speaker comprises at least two speakers which are respectively provided on the left side and the right side of the supporting part of the smart device, that is, on the left side and the right side distal to the human ear; the second speaker comprises at least two speakers which are respectively provided on the left side and the right side of an end of the moving part of the smart device distal to the supporting part, that is, they are on the left and right side proximate to the human ear after being unfolded. The setting positions of the first speaker and the second speaker may be specifically set according to the structure of the actual product. For example, a smart device is taken as an example of smart glasses for illustration, as shown in FIG. 3 (A), which is a structural schematic illustration of the smart glasses, and the smart glasses comprise a left leg and a right leg, each of which is provided with a first speaker and a second speaker. FIG. 3 (B) shows the setting positions of the first speaker and the second speaker on the left leg. Specifically, the first speaker may optionally be provided in the position shown in FIG. 3 (B), i.e., on the leg above the human ear when the smart glasses are worn. The second speaker is provided on a movable bracket proximate to the human ear. When the movable bracket is in an unfolded state, the second speaker is proximate to the human ear. Similarly, the first speaker and the second speaker may be correspondingly provided at the same position of the right leg. Wherein, the first speaker may be a full-range speaker for medium-low frequency, and the second speaker may be a full-range speaker or a medium-high frequency speaker for medium-high frequency.

As shown in FIG. 1, the terminal may include: a processor 1001, such as a CPU (Central Processing Unit), a communication bus 1002, and a memory 1003. Wherein the memory 1003 may be a high-speed RAM memory, or a stable memory (non-volatile memory), such as a disk memory. The memory 1003 optionally may also be a storage device independent of the aforementioned processor 1001.

Optionally, the terminal may also comprise a display, a processor, a sensor, a camera, a battery, and a lens. Wherein, the sensors are, for example, light sensors, motion sensors, and other sensors. Specifically, the light sensor may include an ambient light sensor and a proximity sensor, wherein the ambient light sensor may adjust the brightness of the display according to the brightness of the ambient light, and the proximity sensor may turn on/off the display and/or the backlight when the terminal is moved to the head. As a kind of motion sensor, the gravity acceleration sensor can detect the magnitude of acceleration in each direction (generally three axes), and the magnitude and direction of gravity can be detected when stationary, which can be used for the application of recognizing the terminal's attitude (e.g., horizontal/vertical screen switching, related games, magnetometer attitude calibration), and vibration recognition related functions (e.g., pedometer, knocking), etc.; of course, the terminal may be configured with a gyroscope, a barometer, hygrometer, thermometer, infrared sensor and other sensors, which will not be repeated herein.

It will be understood by those skilled in the art that the terminal structure illustrated in FIG. 1 does not constitute a limitation to the terminal, and may include more or fewer components than illustrated, or a combination of certain components, or a different arrangement of components.

As shown in FIG. 1, an operating system and a control program may be included in memory 1003 as a computer storage medium.

In the terminal shown in FIG. 1, the processor 1001 may be used to invoke the control program stored in the memory 1003 and perform the following operations:

receiving an audio signal, and obtaining a current application scenario according to the audio signal;

determining a target processing manner and a target control mode according to the current application scenario;

processing the audio signal according to the target processing manner to obtain a processed audio signal;

controlling, according to the target control mode, the first speaker and/or the second speaker to output the processed audio signal.

Further, when the current application scenario is an entertainment scenario, the target processing manner is determined as the first processing manner, and the target control mode is determined as the first control mode. The processor 1001 may invoke the control program stored in the memory 1003 and perform the following operations:

performing audio effects processing on the audio signal and performing frequency division processing on the audio signal subjected to the audio effects processing to obtain a medium-low frequency signal and a medium-high frequency signal, wherein the processed audio signal comprises the medium-low frequency signal and the medium-high frequency signal;

sending the medium-low frequency signal to the first speaker and sending the medium-high frequency signal to the second speaker, so as to control the first speaker to output the medium-low frequency signal and control the second speaker to output the medium-high frequency signal.

Further, the smart device comprises a left processing module and a right processing module, and the processor 1001 may invoke the control program stored in the memory 1003 and perform the following operations:

performing the audio effects processing on the audio signal by the left processing module, and performing the frequency division processing on the audio signal subjected to the audio effects processing with a first preset crossover point, so as to obtain a first left ear medium-low frequency signal and a first left ear medium-high frequency signal;

performing the audio effects processing on the audio signal by the right processing module, and performing the frequency division processing on the audio signal subjected to the audio effects processing with the first preset crossover point, so as to obtain a first right ear medium-low frequency signal and a first right ear medium-high frequency signal.

Further, the processor 1001 may invoke the control program stored in the memory 1003 and perform the following operations:

performing the audio effects processing on the audio signal by the left processing module to obtain a left channel audio signal;

copying the left channel audio signal by the left processing module to obtain a first left channel audio signal and a second left channel audio signal;

performing the frequency division processing on the first left channel audio signal by the left processing module with the first preset crossover point, so as to obtain the first left ear medium-low frequency signal; performing the frequency division processing on the second left channel audio signal by the left processing module with the first preset crossover point, so as to obtain the first left ear medium-high frequency signal.

Further, the smart device comprises a main processing module, and the processor 1001 may invoke the control program stored in the memory 1003 and perform the following operations:

performing the audio effects processing on the audio signal by the main processing module to obtain a left channel audio signal and a right channel audio signal;

processing the left channel audio signal by the main processing module to obtain a second left ear medium-low frequency signal and a second left ear medium-high frequency signal;

processing the right channel audio signal by the main processing module to obtain a second right ear medium-low frequency signal and a second right ear medium-high frequency signal.

Further, the processor 1001 may invoke the control program stored in the memory 1003 and perform the following operations:

copying the left channel audio signal by the main processing module to obtain a third left channel audio signal and a fourth left channel audio signal;

performing the frequency division processing on the third left channel audio signal by the main processing module with a second preset crossover point, so as to obtain the second left ear medium-low frequency signal; performing the frequency division processing on the fourth left channel audio signal by the main processing module with the second preset crossover point, so as to obtain the second left ear medium-high frequency signal.

Furthermore, when the current application scenario is a call scenario, the target processing manner is determined as the second processing manner, the target control mode is determined as the second control mode, and the processor 1001 may invoke the control program stored in the memory 1003 and perform the following operations:

performing the audio effects processing on the audio signal to obtain the audio signal subjected to the audio effects processing:

said "controlling, according to the target control mode, the first speaker and/or the second speaker to output the processed audio signal" comprises:

controlling only the second speaker to output the audio signal subjected to the audio effects processing.

Further, and the processor 1001 may invoke the control program stored in the memory 1003 and perform the following operations:

performing digital-to-analog conversion and amplification processing on the audio signal subjected to the audio effects processing to obtain a secondary processed audio signal;

controlling only the second speaker to output the secondary processed audio signal.

Further, and the processor 1001 may invoke the control program stored in the memory 1003 and perform the following operations:

receiving the audio signal and obtaining a signal path corresponding to the audio signal;

determining the current application scenario according to the signal path.

Based on the above hardware structure, various embodiments of the control method for a smart device of the present disclosure are proposed.

The present disclosure provides a control method for a smart device.

Figure 2:
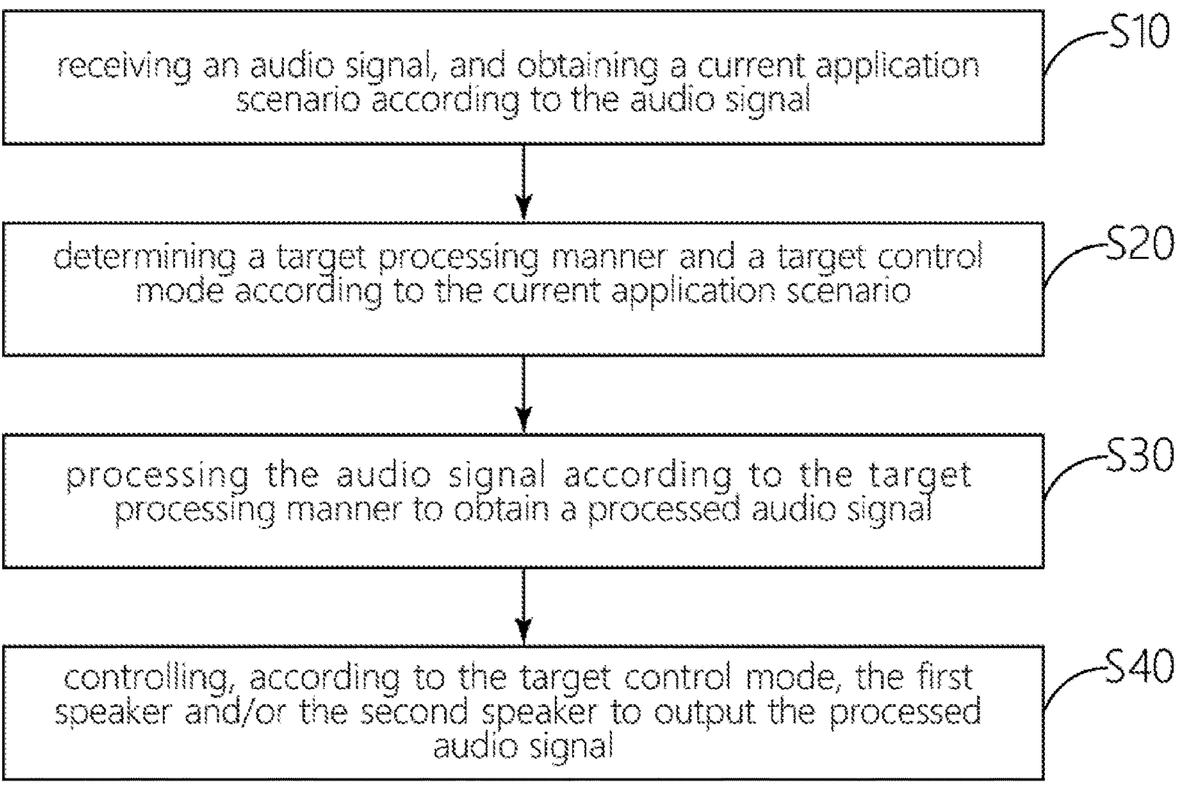
FIG. 2 is a flowchart of a control method for a smart device according to a first embodiment of the present disclosure.

Referring to FIG. 2, FIG. 2 shows a flowchart of a first embodiment of the control method for a smart device of the present disclosure.

In the present embodiment, the control method for a smart device is applied to a smart device comprising a first speaker and a second speaker, and the control method for a smart device comprises:

S10, receiving an audio signal, and obtaining a current application scenario according to the audio signal;

In the present embodiment, the control method for a smart device is applied to the smart device. The type of the smart device may include, but is not limited to, smart glasses, AR/VR devices, smart helmets, and the like. The smart device comprises a first speaker and a second speaker, and further comprises a supporting part and a moving part coupled with the supporting part. As one arrangement of the speaker, the first speaker is provided on the supporting part of the smart device, and the second speaker is provided on an end of the moving part distal to the supporting part, that is, the first speaker is distal to the human ear, the second speaker may be unfolded and provided proximate to the human ear, wherein the first speaker comprises at least two speakers which are respectively provided on the left side and the right side of the supporting part of the smart device, that is, on the left side and the right side distal to the human ear; the second speaker comprises at least two speakers which are respectively provided on the left side and the right side of an end of the moving part of the smart device distal to the supporting part, that is, they are on the left and right side proximate to the human ear after being unfolded. The setting positions of the first speaker and the second speaker may be specifically set according to the structure of the actual product. For example, a smart device is taken as an example of smart glasses for illustration, as shown in FIG. 3 (A), which is a structural schematic illustration of the smart glasses, the smart glasses comprise a left leg and a right leg, each of which is provided with a first speaker and a second speaker. FIG. 3 (B) shows the setting positions of the first speaker and the second speaker on the left leg. Specifically, the first speaker may optionally be provided in the position shown in FIG. 3 (B), i.e., on the leg above the human ear when the smart glasses are worn. The second speaker is provided on a movable bracket proximate to the human ear. When the movable bracket is in an unfolded state, the second speaker is proximate to the human ear. Similarly, the first speaker and the second speaker may be correspondingly provided at the same position of the right leg. Wherein, the first speaker may be a full-range speaker for medium-low frequency, and the second speaker may be a full-range speaker or a medium-high frequency speaker for medium-high frequency.

The smart device may be communicated with the user terminal (such as smart phones, tablets, etc.), and then receive the audio signal sent by the user terminal for playback. After receiving the audio signal, the current application scenario may be obtained first according to the audio signal.

Specifically, step S10 comprises:

Step a11, receiving the audio signal and obtaining a signal path corresponding to the audio signal;

Step a12, determining the current application scenario according to the signal path.

In the present embodiment, since the signal paths of the audio signals of different applications are inconsistent, the mapping relationship between different signal paths and application scenarios may be constructed in advance. After the audio signal is received, the signal path corresponding to the audio signal may be obtained first, and then the current application scenario is determined according to the signal path and the pre-constructed mapping relationship. Wherein, the current application scenario may include, but is not limited to, an entertainment scenario and a call scenario. The entertainment scenario may be a scenario of playing audio data of an entertainment App such as a video, a music, and a game, and the call scenario may be a scenario of making and receiving a call, a video or audio call of each social communication App, and a voice play.

Step S20, determining a target processing manner and a target control mode according to the current application scenario;

Then, a target processing manner and a target control mode are determined according to the current application scenario. Specifically, a mapping relationship between different application scenarios and the processing manner and the control mode may be set in advance to match the current application scenario with the mapping relationship to determine the target processing manner and the target control mode.

Step S30, processing the audio signal according to the target processing manner to obtain a processed audio signal;

Step S40, controlling, according to the target control mode, the first speaker and/or the second speaker to output the processed audio signal.

After determining the target processing manner and target control mode, the audio signal is processed according to the target processing manner to obtain the processed audio signal, and then the first speaker and/or the second speaker are controlled according to the target control mode to output the processed audio signal.

When the current application scenario is an entertainment scenario, the target processing manner is determined as the first processing manner and the target control mode as the first control mode, at the same time, as an implementation, the audio effects processing may be performed on the audio signal first, and the frequency division processing may be performed on the audio signal subjected to the audio effects processing. In order to obtain the medium-low frequency signal and the medium-high frequency signal; then, the medium-low frequency signal is sent to the first speaker, and the medium-high frequency signal is sent to the second speaker, so as to control the first speaker to output medium-low frequency signal and control the second speaker to output medium-high frequency signal. As another implementation, the audio effects processing may be performed on the audio signal first, and the frequency division processing is performed on the audio signal subjected to the audio effects processing, so as to obtain a frequency division signal comprising the medium-low frequency signal and the medium-high frequency signal; then, the medium-low frequency signal and the medium-high frequency signal are digital-to-analog converted and amplified to obtain a processed medium-low frequency signal and a processed medium-high frequency signal, and the processed medium-low frequency signal is sent to the first speaker, and the processed medium-high frequency signal is sent to the second speaker, so as to control the first speaker to output the processed medium-low frequency signal, and control the second speaker to output the processed medium-high frequency signal.

When the current application scenario is a call scenario, the target processing manner is determined as the second processing manner, and the target control mode is determined as the second control mode, at the same time, as an implementation, the audio effects processing may be performed on the audio signal first to obtain the audio signal subjected to the audio effects processing; then, the audio signal subjected to the audio effects processing is sent to the second speaker so as to control the second speaker to output the audio signal subjected to the audio effects processing. As another implementation, the audio effects processing may be performed on the audio signal first to obtain the audio signal subjected to the audio effects processing; then, the audio signal subjected to the audio effects processing is digital-to-analog converted and amplified to obtain a secondary processed audio signal; then, the secondary processed audio signal is sent to the second speaker so as to control the second speaker to output the secondary processed audio signal.

The processes corresponding to the different target processing manners and target control modes may be referred to the following second to fifth embodiments and will not be repeated herein.

Embodiments of the present disclosure provide a control method for a smart device, which is applied to the smart device. The smart device comprises a supporting part and a moving part coupled to the supporting part, as well as a first speaker and a second speaker, the first speaker is provided on the supporting part of the smart device, and the second speaker is provided on an end of the moving part distal to the supporting part; by receiving an audio signal, and obtaining a current application scenario according to the audio signal; then, determining a target processing manner and a target control mode according to the current application scenario; in turn, processing the audio signal according to the target processing manner to obtain a processed audio signal, and controlling, according to the target control mode, the first speaker and/or the second speaker to output the processed audio signal. Wherein, when the audio signal is processed, it will be subjected to frequency division processing or non-frequency division processing according to the current application scenario and sent to the corresponding speaker for output. In this way, it is possible to realize the intelligent control of the smart device to meet the needs in different application scenarios and thus improve the user's experience.

Further, based on the above first embodiment, a second embodiment of the control method for a smart device of the present disclosure is proposed.

In the present embodiment, when the current application scenario is an entertainment scenario, the target processing manner is determined as the first processing manner, and the target control mode is determined as the first control mode, at the same time, the above step S30 may comprise:

Step a31, performing audio effects processing on the audio signal and performing frequency division processing on the audio signal subjected to the audio effects processing to obtain a medium-low frequency signal and a medium-high frequency signal, wherein the processed audio signal comprises the medium-low frequency signal and the medium-high frequency signal;

When the target processing manner is the first processing manner, performing the audio effects processing (including EQ (Equalizer) adjustments, virtual surround, bass enhancement, etc.) on the audio signal first, and then performing the frequency division processing on the audio signal subjected to the audio effects processing, so as to obtain a frequency division signal comprising the medium-low frequency signal and the medium-high frequency signal. The processed audio signal thus comprises the medium-low frequency signal and the medium-high frequency signal.

Further, the step "performing the frequency division processing on the audio signal subjected to the audio effects processing, so as to obtain a frequency division signal" comprises:

performing the frequency division processing on the audio signal subjected to the audio effects processing through a frequency division software or frequency division circuit, so as to obtain a frequency division signal.

When performing the frequency division processing, the frequency division processing may be performed on the audio signal through the frequency division software or frequency division circuit, wherein the crossover point is determined by: the crossover point is comprehensively determined by the effective frequency band of privacy that can be achieved by the sound discharge hole of the rear cavity of the speaker responsible for the mid-bass and the performance of the speaker responsible for the medium-high frequency, and is generally 1 k~2.5 k, and the audio signal with the same gain is a flat line at crossover point after superposition.

at the same time, the step S40 may comprise:

Step a41, sending the medium-low frequency signal to the first speaker and sending the medium-high frequency signal to the second speaker, so as to control the first speaker to output the medium-low frequency signal and control the second speaker to output the medium-high frequency signal.

When the target control mode is the first control mode, after performing the audio effects processing and the frequency division processing on the audio signal, the processed medium-low frequency signal is sent to the first speaker, and the processed medium-high frequency signal is sent to the second speaker, so as to control the first speaker to output the medium-low frequency signal and control the second speaker to output the medium-high frequency signal.

In the present embodiment, in the entertainment scenario, the audio effects processing is performed on the audio signal, and then the frequency division processing is performed to obtain the medium-low frequency signal and the medium-high frequency signal. The medium-low frequency signal is sent to the first speaker distal to the human ear to control the first speaker to output medium-low frequency signal. At the same time, the medium-high frequency signal is sent to the second speaker proximate to the human ear in the unfolded state, so as to control the second speaker to output the medium-high frequency signal. In the above way, it is possible to ensure high privacy while ensuring high sound quality.

Further, based on the above second embodiment, the third embodiment of the control method for a smart device of the present disclosure is proposed.

In the present embodiment, before the above step S40, further comprising:

Step s32, performing digital-to-analog conversion and amplification processing on the medium-low frequency signal and the medium-high frequency signal to obtain the processed medium-low frequency signal and the processed medium-high frequency signal;

In the present embodiment, if it is necessary to perform a format conversion on the audio signal to facilitate the subsequent output of the audio signal, after the audio effects processing and the frequency division processing are performed on the audio signal, then performing digital-to-analog conversion and amplification processing on the medium-low frequency signal and the medium-high frequency signal, so as to obtain the processed medium-low frequency signal and the processed medium-high frequency signal.

at the same time, the step S40 may comprise:

Step s42, sending the processed medium-low frequency signal to the first speaker, and sending the processed medium-high frequency signal to the second speaker, so as to control the first speaker to output the processed medium-low frequency signal and control the second speaker to output the processed medium-high frequency signal.

When the target control mode is the first control mode, sending the processed medium-low frequency signal to the first speaker, and sending the processed medium-high frequency signal to the second speaker, so as to control the first speaker to output the processed medium-low frequency signal and control the second speaker to output the processed medium-high frequency signal.

In the present embodiment, in order to realize the conversion of the audio signal from an analog signal to a digital signal and the removal of pulse signal in audio signal, further performing digital-to-analog conversion and amplification processing on the medium-low frequency signal and the medium-high frequency signal obtained after performing the audio effects processing and the frequency division processing on the audio signal, so as to obtain the processed medium-low frequency signal and the processed medium-high frequency signal, and thus sending the processed medium-low frequency signal to the first speaker distal to the human ear, so as to control the first speaker to output the medium-low frequency signal; at the same time, sending the processed medium-high frequency signal to the second speaker proximate to the human ear in the unfolded state, so as to control the second speaker to output the medium-high frequency signal. In the above way, it is possible to ensure high privacy while ensuring high sound quality in the entertainment scenario.

Further, based on the second embodiment and the third embodiment, it should be noted that different smart devices have different structures. For example, taking smart glasses as an example, as one of the structures, the smart glasses may comprise a left processing module, a left power amplifier module, a right processing module, and a right power amplifier module. The first speaker comprises a first left speaker and a first right speaker, and the second speaker comprises a second left speaker and a second right speaker. Wherein, the left processing module, the left power amplifier module, the first left speaker and the second left speaker are provided on the left leg, and the right processing module, the right power amplifier module, the first right speaker, and the second right speaker are provided on the right leg. The left processing module is electrically connected with the left power amplifier module, the first left speaker and the second left speaker respectively, and the right processing module is electrically connected with the right power amplifier module, the first right speaker and the second right speaker respectively. As another structure, the smart glasses may comprise a main processing module and a main power amplifier module, the first speaker comprises a first left speaker and a first right speaker, the first left speaker is provided on the left leg, the first right speaker is provided on the right leg, the second speaker comprises a second left speaker and a second right speaker, the second left speaker is provided on the left leg, and the second right speaker is provided on the right leg. The main processing module is electrically connected with the main power amplifier module, the first left speaker, the first right speaker, the second left speaker and the second right speaker respectively.

Corresponding to the above first structure, the step a31 may comprise:

Step a311, performing the audio effects processing on the audio signal by the left processing module, and performing the frequency division processing on the audio signal subjected to the audio effects processing with a first preset crossover point, so as to obtain a first left ear medium-low frequency signal and a first left ear medium-high frequency signal;

Step a312, performing the audio effects processing on the audio signal by the right processing module, and performing the frequency division processing on the audio signal subjected to the audio effects processing with the first preset crossover point, so as to obtain a first right ear medium-low frequency signal and a first right ear medium-high frequency signal.

Specifically, the step a311 comprises:

Step a3111, performing the audio effects processing on the audio signal by the left processing module to obtain a left channel audio signal;

Step a3112, copying the left channel audio signal by the left processing module to obtain a first left channel audio signal and a second left channel audio signal;

Step a3113, performing the frequency division processing on the first left channel audio signal by the left processing module with the first preset crossover point, so as to obtain the first left ear medium-low frequency signal; performing the frequency division processing on the second left channel audio signal by the left processing module with the first preset crossover point, so as to obtain the first left ear medium-high frequency signal at the same time, the step a32 comprises:

Step a321, performing digital-to-analog conversion and amplification on the first left ear medium-low frequency signal and the first left ear medium-high frequency signal by the left power amplifier module, so as to obtain a processed first left ear medium-low frequency signal and a processed first left ear medium-high frequency signal;

Step a322, performing digital-to-analog conversion and amplification on the first right ear medium-low frequency signal and the first right ear medium-high frequency signal by the right power amplifier module, so as to obtain a processed first right ear medium-low frequency signal and a processed first right ear medium-high frequency signal;

At the same time, the step a42 comprises:

Step a421, sending the processed first left ear medium-low frequency signal to the first left speaker to control the first left speaker to output the processed first left ear medium-low frequency signal, and sending the processed first left ear medium-high frequency signal to the second speaker to control the second left speaker to output the processed rust left ear medium-high frequency signal;

Step a422, sending the processed first right ear medium-low frequency signal to the first right speaker to control the first right speaker to output the processed first right ear medium-low frequency signal, and sending the processed first right ear medium-high frequency signal to the second speaker to control the second right speaker to output the processed first right ear medium-high frequency signal.

In the present embodiment, the specific processing process of the audio signal and the output process of the processed audio signal are:

when the smart device includes a left processing module and a right processing module, both the left and right processing modules will receive the audio signal. Since the received audio signal is a stereo signal, the audio effects processing (including EQ adjustments, virtual surround, bass enhancement, etc.) may be performed on the audio signal by the left processing module first to obtain a left channel audio signal, and at the same time, the audio effects processing is performed on the audio signal by the right processing module to obtain a right channel audio signal.

Then, the left channel audio signal is copied by the left processing module to obtain two identical audio signals (recorded as the first left channel audio signal and the second left channel audio signal, it should be noted that one of the first left channel audio signal and the second left channel audio signal is the left channel audio signal before copying, the first left channel audio signal is used to input to the first left speaker after frequency division, and the second left channel audio signal is used to input to the second left speaker after frequency division), and then the frequency division processing are performed on the two identical audio signals respectively with the first preset crossover point. The audio signal of one way retains the medium-low frequency signal (recorded as the first left ear medium-low frequency signal), the audio signal of the other way retains the medium-high frequency signal (recorded as the first left ear medium-high frequency signal), and thus digital-to-analog conversion and amplification processing are performed on the first left ear medium-low frequency signal and the first left ear medium-high frequency signal by the left power amplifier module, so as to obtain a processed first left ear medium-low frequency signal and a processed first left ear medium-high frequency signal; finally, sending the processed first left ear medium-low frequency signal to the first left speaker to control the first left speaker to output the processed first left ear medium-low frequency signal, and at the same time, sending the processed first left ear medium-high frequency signal to the second left speaker to control the second left speaker to output the processed first left ear medium-high frequency signal. Wherein, it should be noted that the first preset crossover point is preset, which is determined by: the crossover point is comprehensively determined by the effective frequency band of privacy that can be achieved by the sound discharge hole of the rear cavity of the speaker responsible for the mid-bass and the performance of the speaker responsible for the medium-high frequency, and is generally 1 k~2.5 k, and the audio signal with the same gain is a flat line at crossover point after superposition. In addition, it should be noted that due to the different frequency bands of the first left ear medium-low frequency signal and the first left ear medium-high frequency signal, there is a certain gap in the signal output time, and thus before sending the processed first left ear medium-low frequency signal to the first left speaker and sending the processed first left ear medium-high frequency signal to the second left speaker, it is also necessary to adjust the relative delay time of the first left ear medium-low frequency signal and the first left ear medium-high frequency signal to ensure the normal output of the audio signal.

While the left processing module and the left power amplifier module perform processing, the right processing module and the right processing module perform similar processing at the same time. Specifically, the right channel audio signal is copied by the right processing module to obtain two identical audio signals (recorded as the first right channel audio signal and the second right channel audio signal, it should be noted that one of the first right channel audio signal and the second right channel audio signal is the right channel audio signal before copying, the first right channel audio signal is used to input to the first right speaker after frequency division, and the second right channel audio signal is used to input to the second right speaker after frequency division), and then the frequency division processing are performed on the two identical audio signals respectively with the first preset crossover point. The audio signal of one way retains the medium-low frequency signal (recorded as the first right ear medium-low frequency signal), the audio signal of the other way retains the medium-high frequency signal (recorded as the first right ear medium-high frequency signal), and thus digital-to-analog conversion and amplification processing are performed on the first right ear medium-low frequency signal and the first right ear medium-high frequency signal by the right power amplifier module, so as to obtain a processed first right ear medium-low frequency signal and a processed first right ear medium-high frequency signal; finally, sending the processed first right ear medium-low frequency signal to the first right speaker to control the first right speaker to output the processed first right ear medium-low frequency signal, and at the same time, sending the processed first right ear medium-high frequency signal to the second right speaker to control the second right speaker to output the processed first right ear medium-high frequency signal. Similarly, due to the different frequency bands of the first right ear medium-low frequency signal and the first right ear medium-high frequency signal, there is a certain gap in the signal output time, and thus before sending the processed first right ear medium-low frequency signal to the first right speaker and sending the processed first right ear medium-high frequency signal to the second right speaker, it is also necessary to adjust the relative delay time of the first right ear medium-low frequency signal and the first right ear medium-high frequency signal to ensure the normal output of the audio signal.

Corresponding to the above second structure, the step a31 may comprise:

Step a313, performing the audio effects processing on the audio signal by the main processing module to obtain a left channel audio signal and a right channel audio signal;

Step a3134, processing the left channel audio signal by the main processing module to obtain a second left ear medium-low frequency signal and a second left ear medium-high frequency signal;

Step a315, processing the right channel audio signal by the main processing module to obtain a second right ear medium-low frequency signal and a second right ear medium-high frequency signal;

At the same time, the step a32 may comprise:

Step a323, performing digital-to-analog conversion and amplification processing on the second let ear medium-low frequency signal and the second left ear medium-high frequency signal by the main power amplifier module, so as to obtain a processed second left ear medium-low frequency signal and a processed second left ear medium-high frequency signal, and performing digital-to-analog conversion and amplification processing on the second right ear medium-low frequency signal and the second right ear medium-high frequency signal by the main power amplifier module, so as to obtain a processed second right ear medium-low frequency signal and a processed second right ear medium-high frequency signal;

At the same time, the step a42 may comprise:

Step a423, sending the processed second left ear medium-low frequency signal to the first left speaker so as to control the first left speaker to output the processed second left ear medium-low frequency signal, and sending the processed second left ear medium-high frequency signal to the second left speaker so as to control the second left speaker to output the processed second left ear medium-high frequency signal;

Step a424, sending the processed second right ear medium-low frequency signal to the first right speaker so as to control the first right speaker to output the processed second right ear medium-low frequency signal, and sending the processed second right ear medium-high frequency signal to the second right speaker so as to control the second right speaker to output the processed second right ear medium-high frequency signal.

Wherein, the step a314 specifically comprises:

Step a3141, copying the left channel audio signal by the main processing module to obtain a third left channel audio signal and a fourth left channel audio signal;

Step a3142, performing the frequency division processing on the third left channel audio signal by the main processing module with a second preset crossover point, so as to obtain the second left ear medium-low frequency signal, and performing the frequency division processing on the fourth left channel audio signal by the main processing module, so as to obtain the second left ear medium-high frequency signal.

In the present embodiment, the specific processing process of the audio signal and the output process of processed audio signal are:

performing the audio effects processing (including EQ adjustments, virtual surround, bass enhancement, etc.) on the audio signal by the main processing module to obtain a left channel audio signal and a right channel audio signal, then copying the left channel audio signal and the right channel audio signal respectively to obtain two identical left channel audio signals (recorded as the third left channel audio signal and the fourth left channel audio signal respectively) and two identical right channel audio signals (recorded as the third right channel audio signal and the fourth right channel audio signal respectively), and then performing the frequency division processing on the two identical left channel audio signals respectively with the second preset crossover point. The audio signal of one way retains the medium-low frequency signal (recorded as the second left ear medium-low frequency signal), the audio signal of the other way retains the medium-high frequency signal (recorded as the second left ear medium-high frequency signal). At the same time, performing the frequency division processing on the two identical right channel audio signals respectively with the same second preset crossover point, wherein audio signal of one way retains the medium-low frequency signal (recorded as the second right ear medium-low frequency signal), the audio signal of the other way retains the medium-high frequency signal (recorded as the second right ear medium-high frequency signal). And then, performing digital-to-analog conversion and amplification processing on the second left ear medium-low frequency signal, the second left ear medium-high frequency signal, the second right ear medium-low frequency signal, and the second right ear medium-high frequency signal respectively by the main power amplifier module, so as to obtain a processed second left ear medium-low frequency signal, a processed second left ear medium-high frequency signal, a processed second right ear medium-low frequency signal and a processed second right ear medium-high frequency signal; finally, sending the processed second left ear medium-low frequency signal to the first left speaker to control the first left speaker to output the processed second left ear medium-low frequency signal, and sending the processed second left ear medium-high frequency signal to the second left speaker to control the second left speaker to output the processed second left ear medium-high frequency signal; at the same time, sending the processed second right ear medium-low frequency signal to the first right speaker to control the first right speaker to output the processed second right ear medium-low frequency signal, and sending the processed second right ear medium-high frequency signal to the second right speaker to control the second right speaker to output the processed second right ear medium-high frequency signal. Wherein, it should be noted that the second preset crossover point is preset, which is determined by: the crossover point is comprehensively determined by the effective frequency band of privacy that can be achieved by the sound discharge hole of the rear cavity of the speaker responsible for the mid-bass and the performance of the speaker responsible for the medium-high frequency, and is generally 1 k~2.5 k, and the audio signal with the same gain is a flat line at crossover point after superposition. The second preset crossover point may be the same as or different from the first preset crossover point.

Further, based on the above first embodiment, a fourth embodiment of the control method for a smart device of the present disclosure is proposed.

In the present embodiment, when the current application scenario is a call scenario, the target processing manner is determined as the second processing manner, and the target control mode is determined as the second control mode, at the same time, the above step S30 may comprise:

Step a33, performing audio effects processing on the audio signal to obtain an audio signal subjected to the audio effects processing.

When the target processing manner is the second processing manner, then there is no need to perform the frequency division processing on the audio signal, but directly perform the audio effects processing (including EQ adjustment, virtual surround, bass enhancement, etc.) on the audio signal, so as to obtain the audio signal subjected to the audio effects processing.

at the same time, the step S40 may comprise:

Step a43, controlling only the second speaker to output the audio signal subjected to the audio effects processing.

When the target control mode is determined as the second control mode, sending the audio signal subjected to the audio effects processing which is obtained above to the second speaker, so as to output the processed audio signal only by the second speaker.

In the present embodiment, in the call scenario, the audio signal is refrained from being processed by frequency division processing, and is directly sent to the second speaker for outputting after the audio effects processing, the second speaker being proximate to the human ear in the unfolded state, so as to guarantee privacy of the user during the call.

Further, based on the above fourth embodiment, a fifth embodiment of the control method for a smart device of the present disclosure is proposed.

In the present embodiment, before the above step S40, further comprising:

Step a34, performing digital-to-analog conversion and amplification processing on the audio signal subjected to the audio effects processing to obtain a secondary processed audio signal;

In the present embodiment, if it is necessary to perform a format conversion of the audio signal to facilitate the next output of the audio signal, then performing digital-to-analog conversion and amplification processing on the audio signal subjected to the audio effects processing after performing audio effects processing on the audio signal, so as to obtain a secondary processed audio signal.

at the same time, the step S40 may comprise:

Step a44: controlling only the second speaker to output the secondary processed audio signal.

When the target control mode is determined as the second control mode, sending the secondary processed audio signal which is obtained above to the second speaker, so as to output the processed audio signal only by the second speaker.

In the present embodiment, in order to realize the conversion of the audio signal from an analog signal to a digital signal and the removal of pulse signal in audio signal, further performing digital-to-analog conversion and amplification processing on the audio signal subjected to the audio effects processing after performing the audio effects processing on the audio signal, so as to obtain the secondary processed audio signal and then send it to the second speaker close to the human ear in the unfolded state for output, thereby ensuring the privacy of the user's call process in the call scenario.

Further, for the two different kinds of smart glasses structures mentioned in the above embodiments, correspondingly, in the second processing manner and the second control mode, the specific processing process of the audio signal and the output process of the processed audio signal may be:

1) performing the audio effects processing on the audio signal by the left power amplifier module first to obtain the left channel audio signal, and then performing digital-to-analog conversion and amplification processing on the left channel audio signal to obtain the processed left channel audio signal; and in turn sending the processed left channel audio signal to the second left speaker so as to control the second left speaker to output the processed audio signal. Similarly, performing the audio effects processing on the audio signal by the right power amplifier module first to obtain the right channel audio signal, and then performing digital-to-analog conversion and amplification processing on the right channel audio signal to obtain the processed right channel audio signal: and in turn sending the processed right channel audio signal to the second right speaker so as to control the second right speaker to output the processed audio signal.

2) performing the audio effects processing on the audio signal by the main power amplifier module first to obtain the left channel audio signal and the right channel audio signal, and then performing digital-to-analog conversion and amplification processing on the left channel audio signal and the right channel audio signal respectively to obtain the processed left channel audio signal and the processed right channel audio signal; finally, sending the processed left channel audio signal to the second left speaker so as to control the second left speaker to output the processed audio signal, and at the same time, sending the processed right channel audio signal to the second right speaker so as to control the second right speaker to output the processed audio signal.

The present disclosure further provides a computer readable storage media, the computer readable storage media stores a control program therein, and the control program, when executed by a processor, implements steps of the control method for a smart device described in any one of the above embodiments.

Specific embodiments of the computer readable storage medium of the present disclosure are substantially the same as the various embodiments of the control method for a smart device described above, and will not be repeated herein.

Each embodiment in this specification is described in a parallel or progressive manner, and each embodiment focuses on its differences from other embodiments, and the same or similar parts between each embodiment can refer to each other. For the apparatus disclosed in the embodiments, the description is relatively simple because the apparatus corresponds to the method disclosed in the embodiments, and the relevant points can be found in the description of the method.

It will also be appreciated by one of ordinary skill in the art that the unit and algorithm step of each example described in conjunction with the embodiments disclosed herein can be realized by electronic hardware, computer software, or a combination of the two. In order to clearly illustrate the interchangeability of hardware and software, the components and steps of each example have been described in general terms by function in the above description. Whether these functions are performed in hardware or software depends on the specific application and design constraints of the technical solution. A skilled person may use a different method for each particular application to implement the described function, but such implementation shall not be considered beyond the scope of this disclosure.

The steps of the method or algorithm described in the embodiments disclosed herein can be implemented directly with hardware, software modules executed by processors, or a combination of both. The software module can be placed in random access memory (RAM), memory, read-only memory (ROM), electrically programmable ROM, electrically erasable programmable ROM, registers, hard disks, removable disks, CD-ROMs, or any other form of storage medium known in the technical field.

It should also be noted that in this article, relational terms such as first and second, etc., are used solely to distinguish one entity or operation from another, and do not necessarily require or imply any such actual relationship or sequence between those entities or operations. Further, the term "comprise", "include" or any other variation thereof is intended to cover non-exclusive comprising so that a process, method, article or apparatus that comprises a series of elements includes not only those elements, but also other elements that are not expressly listed, or also comprises elements inherent in such process, method, article or apparatus. Without further limitation, the elements defined by the phrase "comprising a . . . " do not preclude the existence of other identical elements in the process, method, article or apparatus that includes the elements.

The invention claimed is:

1. A control method for a smart device comprising a first speaker and a second speaker, and a supporting part for securing the smart device onto a head of a user and a moving part coupled to the supporting part, the first speaker being provided on the supporting part of the smart device, and the second speaker being provided on an end of the moving part distal to the supporting part, the method comprising:

receiving an audio signal, and obtaining an application scenario according to the audio signal;

determining a target processing manner and a target control mode according to the application scenario;

processing the audio signal according to the target processing manner to obtain a processed audio signal;

controlling the first speaker and/or the second speaker to output the processed audio signal, according to the target control mode;

when the application scenario includes a call scenario, the determining the target processing manner includes a second processing manner, and the determining the target control mode includes a second control mode;

wherein the processing the audio signal according to the target processing manner to obtain a processed audio signal, comprises:

performing an audio effects processing on the audio signal to obtain the audio signal subjected to the audio effects processing;

wherein the controlling the first speaker and/or the second speaker to output the processed audio signal comprises:

controlling the second speaker to output the audio signal subjected to the audio effects processing.

2. The control method for a smart device according to claim 1, wherein when the application scenario includes an entertainment scenario, the determining the target processing manner includes a first processing manner and the determining the target control mode includes a first control mode;

wherein said processing the audio signal according to the target processing manner to obtain a processed audio signal comprises:

performing an audio effects processing on the audio signal and performing a frequency division processing on the audio signal subjected to the audio effects processing to obtain a medium-low frequency signal and a medium-high frequency signal, wherein the processed audio signal comprises the medium-low frequency signal and the medium-high frequency signal;

said controlling the first speaker and/or the second speaker to output the processed audio signal comprises:

sending the medium-low frequency signal to the first speaker for outputting the medium-low frequency signal and sending the medium-high frequency signal to the second speaker for outputting the medium-high frequency signal.

3. The control method for a smart device according to claim 2, wherein the smart device comprises a left processing module and a right processing module, said "performing an audio effects processing on the audio signal and performing a frequency division processing on the audio signal subjected to the audio effects processing to obtain a medium-low frequency signal and a medium-high frequency signal", comprises:

performing the audio effects processing on the audio signal by the left processing module, and performing the frequency division processing on the audio signal subjected to the audio effects processing with a first preset crossover point, to obtain a first left ear medium-low frequency signal and a first left ear medium-high frequency signal;

performing the audio effects processing on the audio signal by the right processing module, and performing the frequency division processing on the audio signal subjected to the audio effects processing with the first preset crossover point, to obtain a first right ear medium-low frequency signal and a first right ear medium-high frequency signal.

4. The control method for a smart device according to claim 3, wherein said "performing the audio effects processing on the audio signal by the left processing module, and performing the frequency division processing on the audio signal subjected to the audio effects processing with a first preset crossover point, to obtain a first left ear medium-low frequency signal and a first left ear medium-high frequency signal", comprises:

performing the audio effects processing on the audio signal by the left processing module to obtain a left channel audio signal;

copying the left channel audio signal by the left processing module to obtain a first left channel audio signal and a second left channel audio signal;

performing the frequency division processing on the first left channel audio signal by the left processing module with the first preset crossover point, to obtain the first left ear medium-low frequency signal; performing the frequency division processing on the second left channel audio signal by the left processing module with the first preset crossover point, to obtain the first left ear medium-high frequency signal.

5. The control method for a smart device according to claim 2, wherein the smart device comprises a main processing module, and said "performing audio effects processing on the audio signal and performing frequency division processing on the audio signal subjected to the audio effects processing to obtain a medium-low frequency signal and a medium-high frequency signal", comprises:

performing the audio effects processing on the audio signal by the main processing module to obtain a left channel audio signal and a right channel audio signal;

processing the left channel audio signal by the main processing module to obtain a second left ear medium-low frequency signal and a second left ear medium-high frequency signal;

processing the right channel audio signal by the main processing module to obtain a second right ear medium-low frequency signal and a second right ear medium-high frequency signal.

6. The control method for a smart device according to claim 5, wherein said "processing the left channel audio signal by the main processing module to obtain a second left ear medium-low frequency signal and a second left ear medium-high frequency signal", comprises:

copying the left channel audio signal by the main processing module to obtain a third left channel audio signal and a fourth left channel audio signal;

performing the frequency division processing on the third left channel audio signal by the main processing module with a second preset crossover point, to obtain the second left ear medium-low frequency signal; performing the frequency division processing on the fourth left channel audio signal by the main processing module with the second preset crossover point, to obtain the second left ear medium-high frequency signal.

7. The control method for a smart device according to claim 1, wherein before said "controlling the first speaker and/or the second speaker to output the processed audio signal" further comprising:

performing digital-to-analog conversion and amplification processing on the audio signal subjected to the audio effects processing to obtain a secondary processed audio signal;

said controlling the first speaker and/or the second speaker to output the processed audio signal comprises:

controlling the second speaker to output the secondary processed audio signal.

8. The control method for a smart device according to claim 1, wherein said receiving an audio signal, and obtaining a application scenario according to the audio signal, comprises:

receiving the audio signal and obtaining a signal path corresponding to the audio signal;

determining the application scenario according to the signal path.

9. A smart device, comprising;

a first speaker, a second speaker, a memory, a processor, a control program stored in the memory and adapted to be run by the processor, wherein when being executed by the processor, the control program implements a control method for a smart device according to claim 1, a supporting part for securing the smart device onto a head of a user and a moving part coupled to the supporting part, the first speaker being provided on the supporting part of the smart device, and the second speaker being provided on an end of the moving part distal to the supporting part, when the application scenario includes a call scenario, the second speaker is configured to output the audio signal subjected to the audio effects processing.

10. The smart device according to claim 9, wherein the first speaker comprises a first left speaker and a first right speaker, and the second speaker comprises a second left speaker and a second right speaker;

the smart device further comprises a left processing module, a right processing module, a left power amplifier module, and a right power amplifier module, wherein the left processing module is electrically connected with the left power amplifier module, the first left speaker, and the second left speaker respectively, and the right processing module is electrically connected with the right power amplifier module, the first right speaker, and the second right speaker respectively; wherein, the left processing module is configured for performing an audio effects processing on the audio signal, and performing a frequency division processing on the audio signal subjected to the audio effects processing with a first preset crossover point, to obtain a first left ear medium-low frequency signal and a first left ear medium-high frequency signal; sending the first left ear medium-low frequency signal and the first left ear medium-high frequency signal to the left power amplifier module;

the left power amplifier module is configured for performing digital-to-analog conversion and amplification processing on the first left ear medium-low frequency signal and the first left ear medium-high frequency signal, to obtain a processed first left ear medium-low frequency signal and a processed first left ear medium-high frequency signal;

the left processing module is further configured for sending a processed first left ear medium-low frequency signal to the first left speaker to for outputting the processed first left ear medium-low frequency signal, and sending a processed first left ear medium-high frequency signal to the second left speaker for outputting the processed first left ear medium-high frequency signal;

the right processing module is configured for performing an audio effects processing on the audio signal, and performing the frequency division processing on the audio signal subjected to the audio effects processing with the first preset crossover point, to obtain a first right ear medium-low frequency signal and a first right ear medium-high frequency signal; sending the first right ear medium-low frequency signal and the first right ear medium-high frequency signal to the right power amplifier module;

the right power amplifier module is configured for performing a digital-to-analog conversion and amplification processing on the first right ear medium-low frequency signal and the first right ear medium-high frequency signal, to obtain a processed first right ear medium-low frequency signal and a processed first right ear medium-high frequency signal;

the right processing module is further configured for sending the processed first right ear medium-low frequency signal to the first right speaker for outputting the processed first right ear medium-low frequency signal, and sending the processed first right ear medium-high frequency signal to the second right speaker for outputting the processed first right ear medium-high frequency signal.

11. The smart device according to claim 9, wherein the first speaker comprises a first left speaker and a first right speaker, and the second speaker comprises a second left speaker and a second right speaker;

the smart device further comprises a main processing module and a main power amplifier module, the main processing module is electrically connected with the main power amplifier module, the first left speaker, the first right speaker, the second left speaker, and the second right speaker respectively; wherein, the main processing module is configured for performing an audio effects processing on the audio signal to obtain a left channel audio signal and a right channel audio signal;

the main processing module is further configured for processing the left channel audio signal to obtain a second left ear medium-low frequency signal and a second left ear medium-high frequency signal; and processing the right channel audio signal to obtain a second right ear medium-low frequency signal and a second right ear medium-high frequency signal;

the main power amplifier module is configured for performing a digital-to-analog conversion and amplification processing on the second left ear medium-low frequency signal and the second left ear medium-high frequency signal, to obtain a processed second left ear medium-low frequency signal and a processed second left ear medium-high frequency signal; and performing the digital-to-analog conversion and amplification processing on the second right ear medium-low frequency signal and the second right ear medium-high frequency signal, to obtain a processed second right ear medium-low frequency signal and a processed second right ear medium-high frequency signal;

the main processing module is further configured for sending the processed second left ear medium-low frequency signal to the first left speaker for outputting the processed second left ear medium-low frequency signal, and sending the processed second left ear medium-high frequency signal to the second left speaker for outputting the processed second left ear medium-high frequency signal;

the main processing module is further configured for sending the processed second right ear medium-low frequency signal to the second right speaker for outputting the processed second right ear medium-low frequency signal, and sending the processed second right ear medium-high frequency signal to the second right speaker for outputting the processed second right ear medium-high frequency signal.

12. The smart device according to claim 9, wherein the first speaker is provided in a fixed position distal to a human ear, and the second speaker is adapted to be unfolded and positioned is capable of being in a first position or a second position both proximate to the human ear.

13. The smart device according to claim 9, wherein the first speaker includes a full-range speaker for medium-low frequency, and the second speaker includes a full-range speaker or a medium-high frequency speaker for medium-high frequency.

14. The smart device according to claim 9, wherein when the application scenario includes an entertainment scenario, the first speaker is configured to output the medium-low frequency signal, and the second speaker is configured to output the medium-high frequency signal.

15. The smart device according to claim 9, wherein in the call scenario, the second speaker is configured to be proximate to a human ear and is in the unfolded state, and the audio signal is refrained from being processed by a frequency division processing and directly sent to the second speaker for outputting after the audio effects processing.

16. A non-transitory computer readable storage media, wherein the computer readable storage media stores a control program therein, and when being executed by a processor, the control program implements the control method for a smart device according to claim 1.

* * * * *